United States Patent [19]

Imamura et al.

[11] Patent Number: 5,090,527
[45] Date of Patent: Feb. 25, 1992

[54] PRESSURE CONTROL SYSTEM FOR LOCK-UP CLUTCH IN AUTOMOTIVE AUTOMATIC POWER TRANSMISSION WITH COMPENSATION OF FLUID PRESSURE IN LOW ENGINE SPEED RANGE

[75] Inventors: Hiroyuki Imamura; Mitsuaki Hashiba, both of Shizuoka, Japan

[73] Assignee: Jatco Corporation, Japan

[21] Appl. No.: 586,751

[22] Filed: Sep. 21, 1990

[51] Int. Cl.⁵ .............................................. F16D 33/16
[52] U.S. Cl. ................................. 192/3.29; 192/3.3; 192/3.31; 192/3.33
[58] Field of Search ................ 192/3.29, 3.3, 3.31, 192/3.33

[56] References Cited

U.S. PATENT DOCUMENTS

| | | | |
|---|---|---|---|
| 4,607,731 | 8/1986 | Sugano | 192/3.29 |
| 4,618,038 | 10/1986 | Ogasawara et al. | 192/3.29 |
| 4,650,047 | 3/1987 | Nishikawa et al. | 192/3.31 |
| 4,828,084 | 5/1989 | Hasegawa et al. | 192/3.29 |

FOREIGN PATENT DOCUMENTS 59-151663  8/1984  Japan ..................... 192/3.3

OTHER PUBLICATIONS

"Jidosha Kogaku Extra Edition", vol. 37, No. 7, pp. 214 to 249.

Primary Examiner—Leslie A. Braun
Assistant Examiner—Nicholas Whitelaw
Attorney, Agent, or Firm—Ronald P. Kananen

[57] ABSTRACT

A pressure control system for a lock-up clutch includes a variable flow restriction orifice disposed in a lubricating circuit. The variable flow restriction orifice is operated depending upon a discharge rate of an oil pump so that working fluid flow through the lubricating circuit is restricted when the discharge rate of the oil pump is smaller than a predetermined value.

12 Claims, 5 Drawing Sheets

PRESSURE CONTROL SYSTEM FOR LOCK-UP CLUTCH IN AUTOMOTIVE AUTOMATIC POWER TRANSMISSION WITH COMPENSATION OF FLUID PRESSURE IN LOW ENGINE SPEED RANGE

BACKGROUND OF THE INVENTION

1. Field of the Invention

The present invention relates generally to a lock-up control system for an automatic power transmission of an automotive vehicle. More specifically, the invention relates to a pressure control system for a lock-up clutch for establishing and releasing a lock-up state with compensation of fluid pressure particularly at low engine speed range.

2. Description of the Background Art

One example of a conventional lock-up clutch pressure control system has been disclosed in "Jidosha Kogaku Extra Edition Vol. 37, No. 7", published by Tesudo no Nihon, June, 1989, pages 214 to 249. On page 221 of this publication, a working fluid discharged from an oil pump is introduced into a torque converter via a pressure regulator valve for generating a torque converter pressure. The working fluid is also used for controlling a lock-up clutch as introduced into a lock-up control fluid circuit which includes a lock-up control valve. An extra flow rate of the working fluid is introduced into a lubricating circuit which supplies the working fluid to components to be lubricated as lubricant.

However, in such prior proposed pressure control system, all of extra flow rate of the working fluid is relieved into the lubricating circuit. A low engine speed range, the discharge rate of the oil pump can become insufficient. In such occasion, because of leakage through the fluid circuit including the amount used for lubrication, the lock-up clutch actuation pressure can become insufficient. This results in prolongation of a clutch engaging and disengaging transition period when a transmission speed ratio is shifted. Particularly, this tendency will be increased while the working fluid temperature is relatively high. Especially, such lag time will creates problems at drive range selection N (neutral) range or P (parking) range to R (reverse) range or D (automatic shifting) range. Namely, during the lag dime with incomplete engagement or delay of engagement of the lock-up clutch, durability of the clutch can be reduced. Furthermore, due to incomplete engagement or delay of engagement, no load acceleration of the engine or an uncomfortable vibration of the vehicular body can be caused for degradation of vehicular drivability.

Such defects may be improved by providing a greater discharge rate for the oil pump even at low engine speed range. However, increasing of discharge rate of the oil pump necessarily causes increasing of the engine load for degradation of fuel economy. Particularly, since the discharge rate of the oil pump at a relatively high speed range will never become insufficient. An increased discharge rate at the low engine speed range simply increases the wasting of engine output at high speed range.

SUMMARY OF THE INVENTION

Therefore, it is an object of the present invention to provide a pressure control system for a lock-up clutch of an automotive automatic power transmission, according to the present invention, which can compensate fluid pressure for better engaging and disengaging transition characteristics.

In order to accomplish the aforementioned and other objects, a pressure control system for a lock-up clutch includes a variable flow restriction orifice disposed in a lubricating circuit. The variable flow restriction orifice is operated depending upon a discharge rate of an oil pump so that working fluid flow through the lubricating circuit is restricted when the discharge rate of the oil pump is smaller than a predetermined value.

According to one aspect of the invention, a pressure control system for a lock-up clutch of a lock-up type automotive automatic power transmission comprises:

a torque converter associated with an input element inputting driving torque from a prime mover and an output element for outputting driving torque, the torque converter including a lock-up clutch for establishing and releasing a direct and mechanical connection between the input and output elements;

a lock-up control fluid circuit connected to a pressurized fluid source which is has a variable discharge rate depending upon an engine revolution speed, for adjusting fluid pressure to be applied to the lock-up clutch for engaging and disengaging the lock-up clutch depending upon vehicle driving condition;

a lubricating circuit branched from the lock-up control circuit for circulating part of a working fluid flowing in the lock-up control fluid circuit for lubrication; and a flow restriction means associated with the lubricating circuit for varying magnitude of the flow restriction depending upon discharge rate of the pressurized fluid source so as to reduce an amount of working fluid to be introduced into the lubricating circuit while the discharge rate of the pressurized fluid source is smaller than a given value.

In the preferred construction, the flow restriction means includes a fixed path area orifice, a by-pass circuit by-passing the orifice and a valve permitting and blocking fluid flow through the by-pass circuit. In such case, the valve in the flow restriction means may be normally biased for blocking fluid flow through the by-pass circuit and responsive to a by-pass circuit control fluid pressure which is variable depending upon discharge rate of the pressurized fluid source and greater than a predetermined set pressure for shifting to permit fluid flow through the by-pass circuit. In such case, the valve may be responsive to lowering of the by-pass circuit control fluid pressure across a flow blocking criterion pressure which is set lower than the set pressure for shifting to block fluid flow through the by-pass circuit. The by-pass circuit control fluid pressure may be a torque converter release pressure.

In the alternative, the valve comprises an electromagnetic valve including a valve spool movable between a flow permitting position for permitting fluid flow through the by-pass circuit and a flow blocking position for blocking fluid flow through the by-pass circuit, the valve spool being normally biased toward the flow blocking position to be placed at the flow blocking position and operated into the flow permitting position by means of an electromagnetic actuator in response to a by-pass control signal which is produced when the discharge rate of the pressurized fluid source is greater than the given value. In such case, the by-pass control signal is produced while an engine speed represents the engine driving condition other than an idling state. In addition, it is possible to determine the by-pass control signal when a vehicle speed is lower than a predetermined vehicle speed criterion representing substantially low vehicle speed in addition to the low engine speed.

According to another aspect of the invention, in a pressure control system for a lock-up clutch of a lock-up type automotive automatic power transmission including a torque converter associated with an input element inputting driving torque from a prime mover and an output element for outputting driving torque, the torque converter including a lock-up clutch for establishing and releasing direct and mechanical connection between the input and output elements, a lock-up control fluid circuit connected to a pressurized fluid source which has a variable discharge rate depending upon an engine revolution speed, for adjusting fluid pressure to be applied to the lock-up clutch for engaging and disengaging the lock-up clutch depending upon vehicle driving condition, a lubricating circuit branched from the lock-up control fluid circuit for circulating part of working fluid flowing in the lock-up control fluid circuit for lubrication, a method for controlling fluid supply comprises the steps of:

providing a flow restriction means in the lubricating circuit for varying magnitude of flow restriction for varying fluid flow rate through the lubricating circuit;

monitoring the discharge rate of the pressurized fluid source; and controlling the flow restriction means for providing greater flow restriction magnitude while the monitored discharge rate is smaller than a given value and for providing smaller flow restriction magnitude when the monitored discharge rate is greater than the given value.

BRIEF DESCRIPTION OF THE DRAWINGS

The present invention will be understood more fully from the detailed description given herebelow and from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
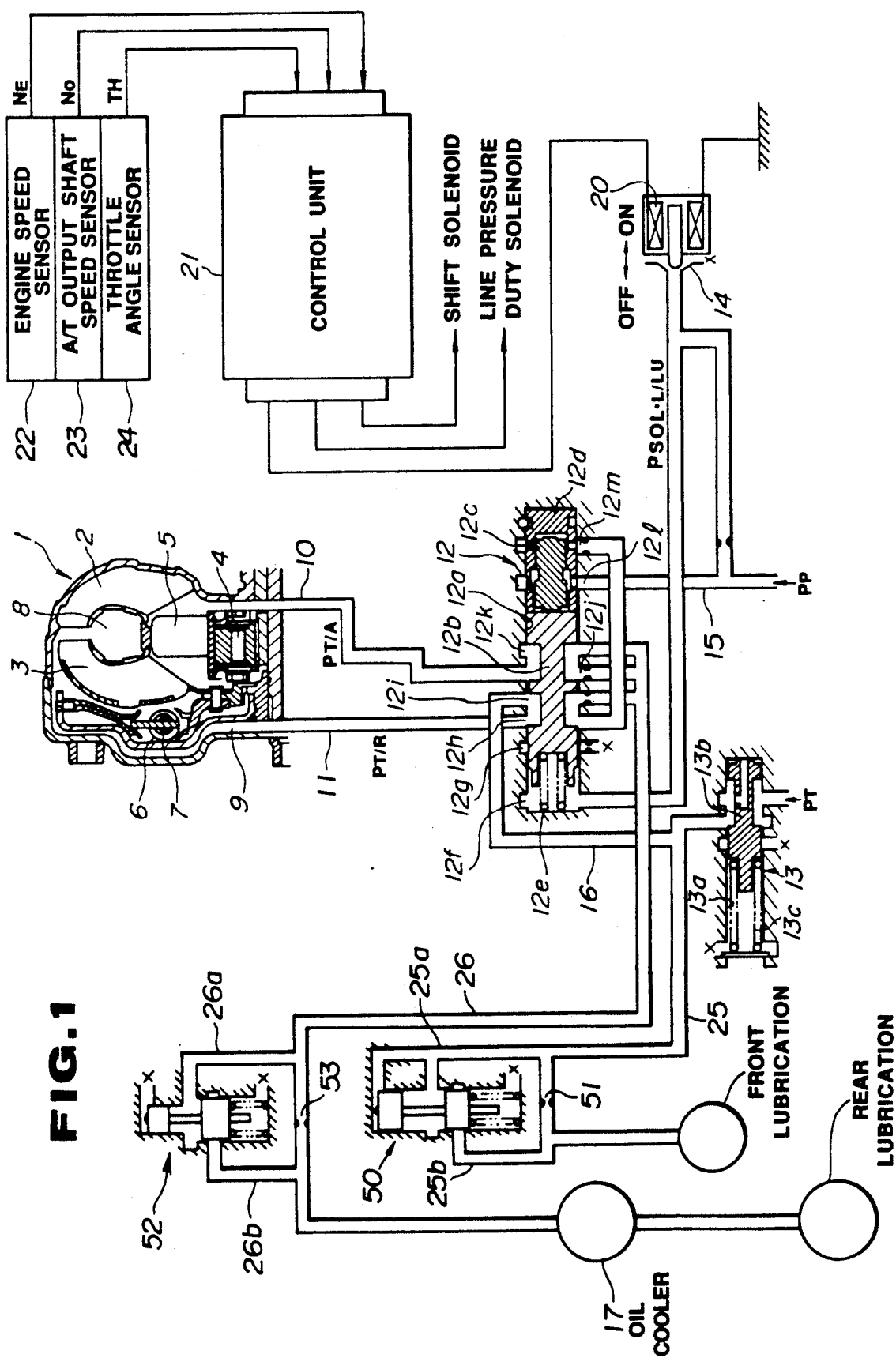
FIG. 1 is a block diagram of the preferred embodiment of a pressure control system for a lock-up clutch in an automatic power transmission, according to the present invention.

Referring now to the drawings, particularly to FIG. 1, the preferred embodiment of a pressure control system for a lock-up clutch of an automatic power transmission, according to the present invention, includes a torque converter 1. The torque converter 1 comprises a pump impeller 2 and a turbine runner 3. The pump impeller 2 is connected to an automotive internal combustion engine acting as a prime mover to be rotatingly driven by the driving torque supplied therefrom. This pump impeller 2 thus serves as an input element. On the other hand, the turbine runner 3 is designed to be driven by the pump impeller 2 via working fluid. This turbine runner 3 thus serves as an output element. A stator 5 is fixed on a converter casing via an one-way clutch 4. A lock-up clutch 6 is also provided in the torque converter 1 for establishing direct coupling of the pump impeller 2 and the turbine runner 3 for establishing a lock-up state. A clutch damper 7 which comprises a torsion spring, is disposed between the turbine runner 3 and the lock-up clutch 6 for absorbing excessive torque in the lock-up state.

A pressure control system for the lock-up clutch 6 includes an apply pressure path 10 connected to a lock-up apply chamber 8 and a release pressure path 11 connected to a lock-up release chamber 9. The apply pressure path 10 and the release pressure path 11 are both connected to a lock-up control valve 12. The lock-up control valve 12 is designed to modulate a lock-up apply pressure $P_{T/A}$ and a lock-up release pressure $P_{T/R}$. A torque converter pressure relief valve 13 is also provided for relieving an excess level of torque converter pressure $P_T$ which serves as basic pressure of the lock-up apply pressure $P_{T/A}$. A lock-up solenoid 14 is provided for modulating a lock-up solenoid pressure $P_{sol.L/U}$ from a pilot pressure $P_p$ according to a duty command signal externally applied thereto, which lock-up solenoid pressure is active for operating the lock-up control valve 12. A pilot pressure path 15 is provided for applying the pilot pressure $P_p$ for the lock-up control valve 12 during an open converter state or a slip lock-up state and applying a line pressure $P_L$ during a complete lock-up state.

The lock-up control valve 12 defines a valve bore 12a, in which is disposed a valve spool 12b, a plug 12c, a sleeve 12d and a spring 12e. A plurality of ports 12f, 12g, 12h, 12i, 12j, 12k, 12l and 12m are communicated with the valve bore 12a. The port 12f is communicated with a lock-up pressure path 18 to introduce therethrough the lock-up solenoid pressure $P_{sol.L/U}$ when the lock-up solenoid valve 14 is active. The port 12g serves as a drain port for draining the working fluid. The ports 12h and 12m are connected to the lock-up release pressure path 11. The port 12i is communicated with the torque converter pressure path 16. The port 12j is communicated with the lock-up apply pressure path 10. The port 12k is communicated with an oil cooler 17 together with the ports 12i and 12j. The port 12l is communicated with the pilot pressure path 15 to introduce the pilot pressure $P_p$. The valve spool 12b is provided with a plurality of pressure receiving sections respectively subjected to the lock-up solenoid pressure $P_{sol.L/U}$, the lock-up apply pressure $P_{T/A}$, the pilot pressure $P_p$ and the lock-up release pressure $P_{T/R}$ as applied. These pressure receiving sections are explanatorily illustrated in FIG. 5.

The torque converter relief valve 13 is provided for preventing an increase in the torque converter pressure $P_T$ to an excessive level. The torque converter relief valve 13 is formed with a valve bore 13a in which is disposed a valve spool 13b which internally defines a fluid path opening, and a spring 13c. The torque converter relief valve 13 is active in response to the torque converter pressure $P_T$ supplied from a pressure regulator valve (not shown) higher than a set pressure determined by the spring 13c for draining the excess part of the pressurized fluid for limiting the fluid pressure discharged therefrom at the set pressure.

The lock-up solenoid valve 14 is maintained in a closed position while a lock-up solenoid 20 is deenergized for supplying the pilot pressure $P_p$ to the port 12f of the lock-up control valve 12. On the other hand, when the solenoid 20 is energized, the lock-up solenoid valve 14 is open to drain the pilot pressure $P_p$ and modulate the lock-up solenoid pressure $P_{sol.L/U}$.

Figure 4:
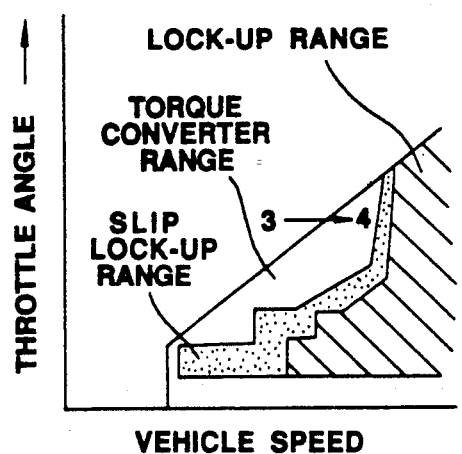
FIG. 4 is a chart showing a lock-up schedule in the shown embodiment of the pressure control system.
Figure 6:
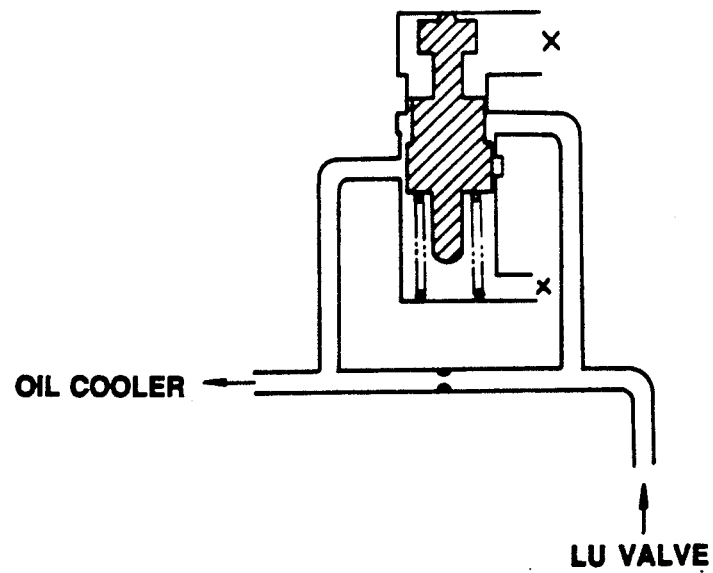
FIG. 6 is a section showing another embodiment of a rear side switching valve to be employed in the preferred embodiment of the pressure control system according to the invention.

The duty operated lock-up solenoid 20 in the lock-up solenoid valve 14 operates as an actuator. The solenoid 20 is connected to a control unit (ATCU) 21. The control unit 21 is connected to an engine speed sensor 22 which monitors an engine revolution speed to produce an engine speed indicative signal Ne, a transmission output shaft speed sensor 23 which monitors rotation speed of an output shaft of the automatic power transmission as a vehicle speed indicative parameter and thus produces an output speed indicative signal No, and a throttle angle sensor 24 for monitoring angular position of a throttle valve in an air induction system of the engine to produce a throttle angle indicative signal TH. The control unit 21 derives a duty ratio of a slip control signal As can be appreciated, the control unit 21 performs not only the lock-up control but also shift control for providing a shifting command for a shift solenoid (not shown), line pressure control for adjusting line pressure by controlling line pressure duty solenoid (not shown) and so forth. Therefore, a plurality of mutually distinct control routines are executed by the control unit 21 as governed by a main control program. In the lock-up control, the lock-up control routine is executed for performing lock-up control by a lock-up control command for the lock-up solenoid 20 according to a predetermined lock-up schedule. In the shown embodiment, the lock-up control is performed according to the lock-up schedule as illustrated in FIG. 4.

Figure 2:
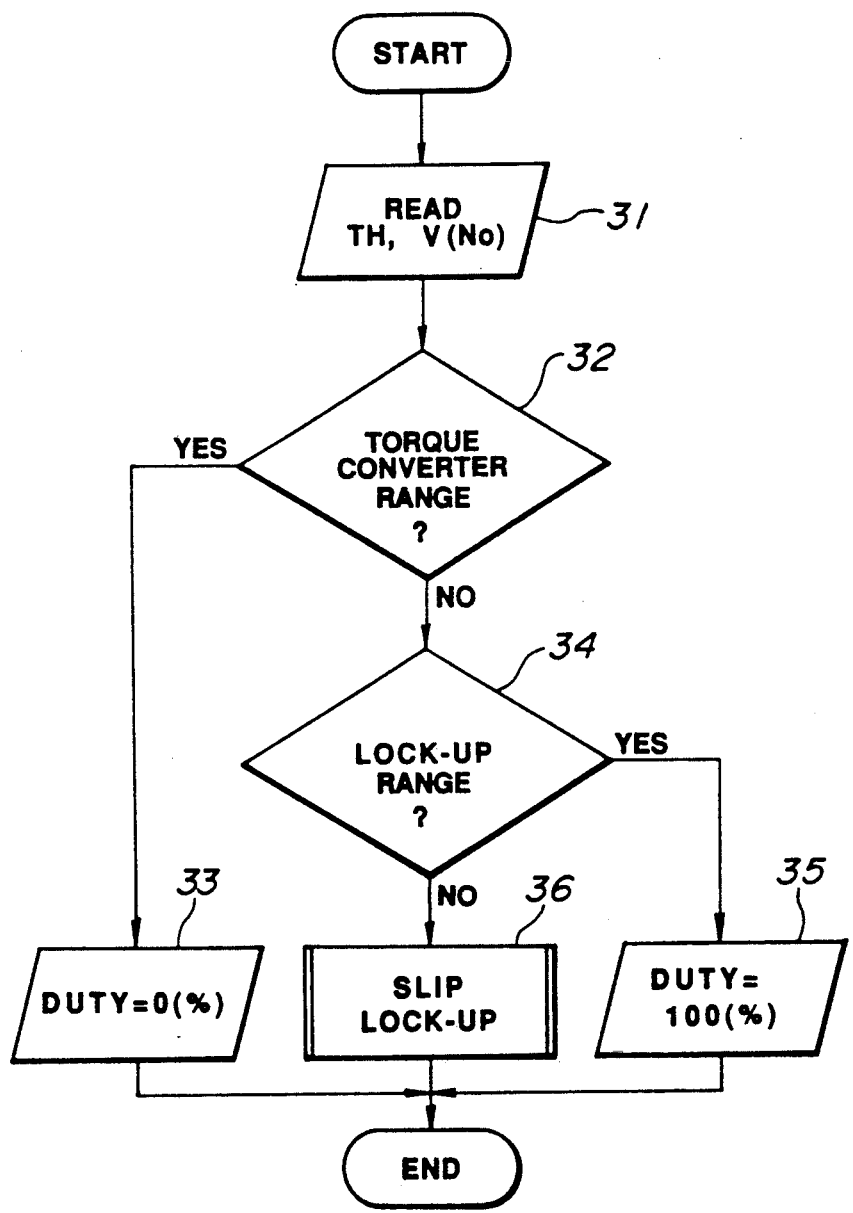
FIG. 2 is a flowchart showing a main routine of lock-up control to be executed by a control unit in the pressure control system of FIG. 1.

The lock-up control process will be discussed herebelow with reference to FIGS. 2 and 3. The shown routines may be executed periodically with given intervals. The routine shown in FIG. 2 is a main routine of the lock-up control. On the other hand, the routine shown in FIG. 3 is a sub-routine for performing a transition control for establishing a lock-up state from an open converter state across the slip lock-up state.

Immediately after starting execution of the routine of FIG. 2, the throttle angle indicative signal TH and the output speed indicative signal No as the vehicle speed indicative data are read out at a step 31. Then, the instantaneous driving condition is checked against the lock-up schedule of FIG. 4 on the basis of the throttle valve open angle as represented by the throttle angle indicative signal TH and the vehicle speed as represented by the output speed indicative signal No. at a step 32. In fact, a check is performed at a step 32 whether the driving range is in a torque converter range. If the driving range is in a torque converter range as checked at the step 32, the duty ratio of the lock-up control command is set at zero percent (0%) for maintaining the lock-up solenoid 20, at a step 33. Therefore, the lock-up solenoid valve 14 is maintained in closed position for maintaining the lock-up clutch 6 in released state.

On the other hand, when the driving range as checked at the step 32 is other than the torque converter range, then, a check is performed to determined whether the driving range is in a lock-up range, at a step 34. A check at the step 34 is performed on the basis of the vehicle speed and the throttle vale open angle with respect to the lock-up schedule of FIG. 4. If the driving range is within the lock-up range as checked at the step 34, the duty ratio of the lock-up control command is set at hundred percent (100%) to maintain the lock-up solenoid 20 at open position for establishing a complete engagement of the lock-up clutch 6. On the other hand, when the driving range other than the lock-up range is detected as checked at the step 34, a slip lock-up control routine illustrated in FIG. 3 is triggered at a step 36.

Figure 3:
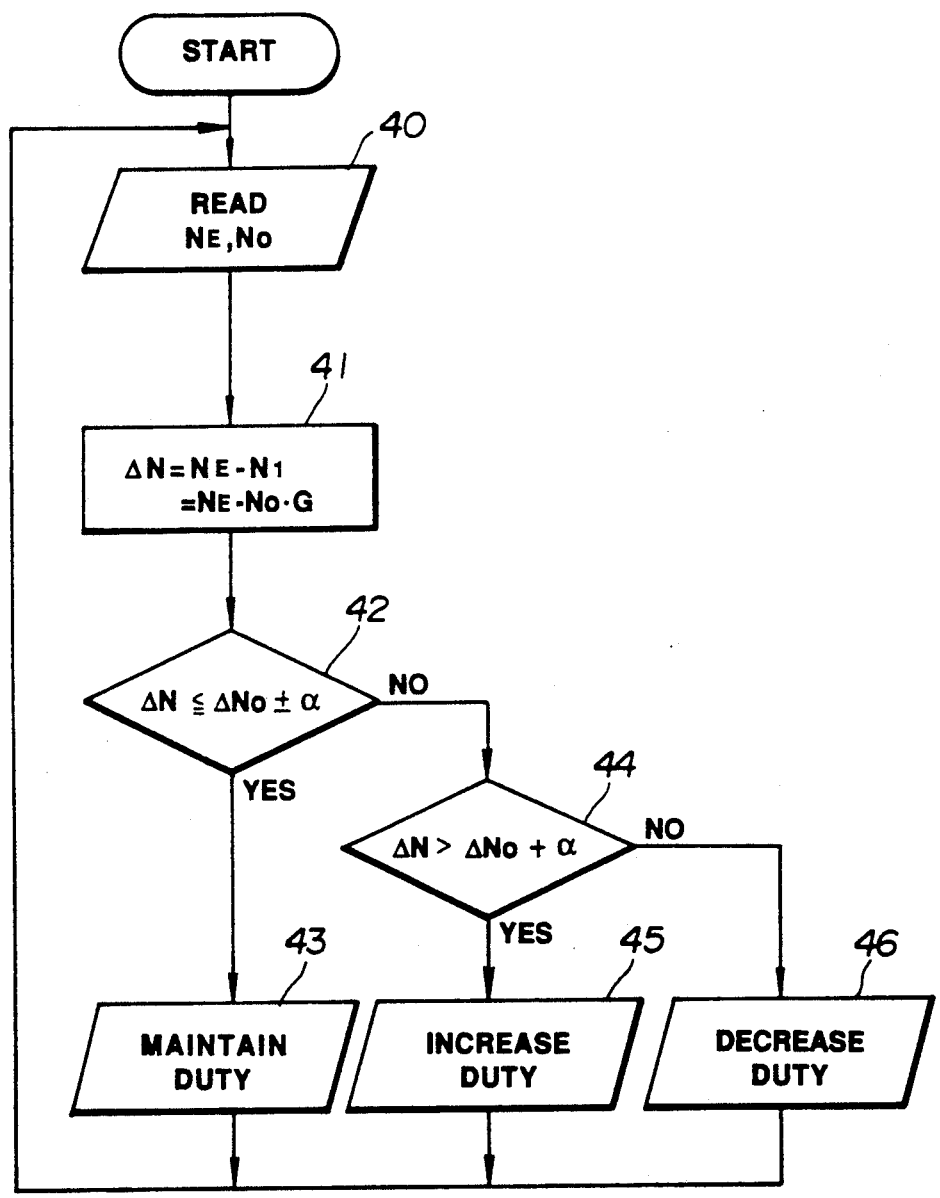
FIG. 3 is a flowchart showing a sub-routine of slip lock-up control to be executed by the control unit in the pressure control system of FIG. 1.

Therefore, the sub-routine of FIG. 3 is triggered at the step 36 of the lock-up control main routine. Immediately after starting execution, the engine speed indicative signal value Ne and the output speed indicative signal No are read out at a step 40. Then, a torque converter slip magnitude $\Delta N$ is derived at a step 41. Practically, the torque converter slip magnitude $\Delta N$ can be derived through the following equations:

$$\Delta N = Ne - N_{ET}$$
$$= Ne - No \cdot G$$

The torque converter slip magnitude $\Delta N$ is used for controlling the slip magnitude to a target torque converter slip magnitude $\Delta No$. In practice, adjustment of the torque converter slip magnitude is performed by feedback controlling the duty ratio of the control signal to be supplied to the lock-up solenoid 20. A process for deriving the duty ratio of the control signal is performed through the step 42 and subsequent steps.

At the step 42, discrimination is performed to determine whether the torque converter slip magnitude $\Delta N$ is within a predetermined range $\pm \alpha$ set with respect to the target slip magnitude $\Delta No$. The predetermined range $\pm \alpha$ represents the acceptable tolerating range of the torque converter slip magnitude. Therefore, when the torque converter slip magnitude converter slip magnitude $\Delta N$ is smaller than or equal to $\Delta No + \alpha$ and is greater than or equal to $\Delta No - \alpha$, judgement can be made that the torque converter slip magnitude is within the acceptable tolerating range. Therefore, at a step 43, the control signal for maintaining the duty ratio unchanged is output. On the other hand, when the torque converter slip magnitude $\Delta N$ is smaller than $\Delta No - \alpha$ or greater than $\Delta No + \alpha$, as checked at the step 43, a check is again performed at a step 44 whether the torque converter slip magnitude $\Delta N$ is greater than $\Delta No + \alpha$. When the torque converter slip magnitude $\Delta N$ is greater than $\Delta No + \alpha$, then the duty ratio is increased in a given rate at a step 45. On the other hand, when the torque converter slip magnitude $\Delta N$ is smaller than $\Delta No + \alpha$ as checked at the step 46, the duty ratio is decreased in a given rate at a step 46. As can be appreciated, by adjusting the duty ratio of the control signal through the steps 42 to 46.

The oil pump discharge rate dependent control will be hereafter discussed with respect to different engine operational modes. When the engine is in an idling state, the discharge rate of the oil pump becomes relatively low. At this state, the torque converter release pressure $P_{T/R}$ is maintained substantially low. Therefore, both switching valves 50 and 52 are maintained at a closed position by means of a spring, as shown in FIG. 1. As a result, the fluid flow through front lubrication by-pass circuits 25a and 25b and rear lubrication by-pass circuits 26a and 26b is blocked. Therefore, fluid flow rate flowing through the lubricating circuit is restricted by means of flow restriction orifices 51 and 53.

It should be appreciated that since the required amount of lubricant at the engine idling state is relatively small, the restricted amount of the working fluid supplied through the lubricating circuit will affect lubricating performance.

As can be appreciated herefrom, with the shown arrangement, the amount of working fluid consumed for lubrication, which is the major part of the leak amount of the working fluid, is successfully reduced. Therefore, the line pressure can rise to a sufficiently high level. As a result, a sufficiently high lock-up apply pressure can be obtained for maintaining the torque converter slip magnitude within an acceptable range. This successfully shortens a transition period in engaging the clutch and/or brake upon operational range shifting, such as P range to D range shifting, P range to R range shifting, N range to D range shifting, N range to R range shifting and so forth. Therefore, even when the accelerator is depressed immediately after NOR, NOD, PAR or PAD shifting operation, an incomplete engagement or lag in engagement of the clutch can be successfully avoided. This provides a sufficiently long period duration of the clutch and eliminates possibility of causing uncomfortable no-load acceleration of the engine or vehicular body vibration.

On the other hand, when the engine is driven at a relatively high speed, the discharge rate of the oil pump becomes substantially high. In such case, the torque converter release pressure $P_{T/R}$ reaches a high level. With high level torque converter release pressure $P_{T/R}$, the valve spools of the switching valves 50 and 52 are shifted against the spring force of the bias spring to establish fluid communication therethrough. Therefore, working fluid flows through the front and rear lubricating circuits 25a, 25b and 26a, 26b is permitted, thus by-passing the flow restriction orifices 51 and 53. As a result, an unlimited amount of lubricant can be supplied to the components to be lubricated for establishing satisfactory lubrication.

Figure 5:
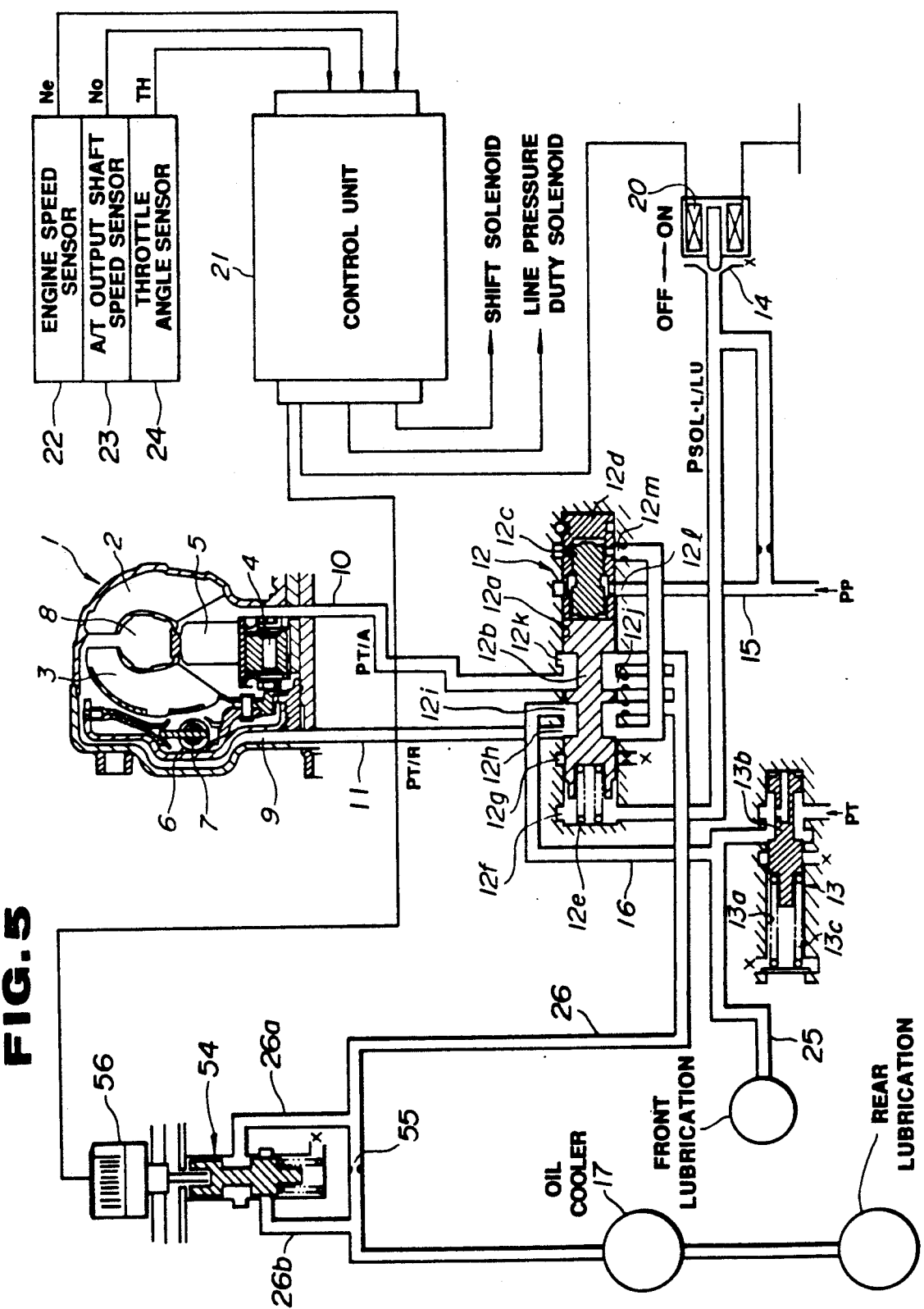
FIG. 5 is a block diagram of another embodiment of the pressure control system according to the present invention.

FIG. 5 shows another embodiment of the pressure control system according to the present invention. In this embodiment, flow restriction under low engine speed condition is provided only for rear part lubrication. In this embodiment, fluid flow restriction control for the rear part lubricating circuit, is performed depending upon vehicle speed.

In the shown embodiment, a flow restriction means includes the rear lubrication by-pass circuits 26a and 26b associated with a switching valve 54. The rear lubrication by-pass circuits 26a and 26b by-pass the flow restriction orifice 55 in the rear lubrication circuit. The switching valve 54 is associated with an electromagnetic actuator 56 which is connected to the control unit 21. In the shown embodiment, the valve spool of the switching valve 54 normally biased for blocking fluid flow through the rear lubrication by-pass circuits 26a and 26b by means of a bias spring. Therefore, the valve spool of the switching valve 54 is normally maintained at flow blocking position. The electromagnetic actuator 56 is energized in response to a control signal supplied from the control unit 21 for shifting the valve spool against the spring force of the bias spring for establishing fluid communication through the rear lubrication by-pass circuits 26a and 26b.

In the shown embodiment, the control signal to be supplied to the electromagnetic actuator 56 is produced when a vehicle speed is higher than a predetermined speed which represents substantially low vehicle speed, and the engine speed is substantially at an idling speed.

As can be appreciated, the present invention can maintain the line pressure at a sufficiently high level even when the engine speed is substantially low and thus the discharge rate of the oil pump is substantially small. Therefore, lock-up engaging and disengaging transition can be satisfactorily shortened.

Therefore, the present invention fulfills all of the objects and advantages sought therefore.

While the present invention has been discussed in detail in terms of the specific embodiments of the invention, the invention can be embodied or modified in various fashions. Therefore, the invention should be understood to include all possible embodiments and modifications which can be implemented without departing from the principle of the invention which is set out in the appended claims.

For example, though the electromagnetically controlled valve has been embodied in the foregoing second embodiment, the valve can be controlled by a vehicle speed dependent pressure, such as that modulated by a governor valve. Furthermore, it may be possible to adjust flow restriction magnitude for an oil cooler depending upon a fluid temperature which is monitored by a fluid temperature sensor.

Furthermore, it is possible to introduce a fluid pressure lower than the torque converter release pressure to the end opposite to the side where the torque converter pressure is exerted, in the first embodiment, so that the lower fluid pressure may cooperate with the spring force of the spring to differentiate the valve open pressure and the valve close pressure for providing hysterisis in valve action.

What is claimed is:

1. A pressure control system for a lock-up clutch of a lock-up type automotive automatic power transmission, comprising:

a torque converter associated with an input element inputting driving torque from a prime mover and an output element for outputting driving torque, said torque converter including a lock-up clutch for establishing and releasing direct and mechanical connection between said input and output elements;

a lock-up control fluid circuit connected to a pressurized fluid source which has a variable discharge rate depending upon an engine revolution speed, for adjusting fluid pressure to be applied to said lock-up clutch for engaging and disengaging said lock-up clutch depending upon vehicle driving condition;

a lubricating circuit branched from said lock-up control circuit for circulating part of working fluid flowing in said lock-up control fluid circuit for lubrication; and a flow restriction means associated with said lubricating circuit for continuously varying magnitude of flow restriction during operation of said pressurized fluid source depending upon discharge rate of said pressurized fluid source so as to reduce working fluid amount to be introduced into said lubricating circuit while the discharge rate of said pressurized fluid source is smaller than a given value.

2. A pressure control system for a lock-up clutch of a lock-up type automotive automatic power transmission, comprising:
   a torque converter associated with an input element inputting driving torque from a prime mover and an output element for outputting driving torque, said torque converter including a lock-up clutch for establishing and releasing direct and mechanical connection between said input and output elements;
   a lock-up control fluid circuit connected to a pressurized fluid source which has a variable discharge rate depending upon an engine revolution speed, for adjusting fluid pressure to be applied to said lock-up clutch for engaging and disengaging said lock-up clutch depending upon vehicle driving condition;
   a lubricating circuit branched from said lock-up control circuit for circulating part of a working fluid flowing in said lock-up control fluid circuit for lubrication;
   a flow restriction means associated with said lubricating circuit for varying magnitude of flow restriction depending upon discharge rate of said pressurized fluid source so as to reduce an amount of working fluid to be introduced into said lubricating circuit while the discharge rate of said pressurized fluid source is smaller than a given value; and
   said flow restriction means includes a fixed path area orifice, a by-pass circuit by-passing said orifice and a valve permitting and blocking fluid flow through said by-pass circuit.

3. A pressure control system as set forth in claim 2, wherein said valve in said flow restriction means is normally biased for blocking fluid flow through said by-pass circuit and responsive to a by-pass circuit control fluid pressure which is variable depending upon discharge rate of said pressurized fluid source and greater than a predetermined set pressure for shifting to permit fluid flow through the by-pass circuit.

4. A pressure control valve system as set forth in claim 3, wherein said valve is responsive to lowering of said by-pass circuit control fluid pressure across a flow blocking criterion pressure which is set lower than said set pressure for shifting to block fluid flow through the by-pass circuit.

5. A pressure control valve system as set forth in claim 3, wherein said by-pass circuit control fluid pressure is a torque converter release pressure.

6. A pressure control valve system as set forth in claim 2, wherein said valve comprises an electromagnetic valve including a valve spool movable between a flow permitting position for permitting fluid flow through said by-pass circuit and a flow blocking position for blocking fluid flow through said by-pass circuit, said valve spool being normally biased toward said flow blocking position to be placed at said flow blocking position and operated into said flow permitting position by means of an electromagnetic actuator in response to a by-pass control signal which is produced when the discharge rate of said pressurized fluid source is greater than said given value.

7. A pressure control system as set forth in claim 6, wherein said by-pass control signal is produced while an engine speed represents the engine driving condition other than an idling state.

8. A pressure control system as set forth in claim 6, wherein said by-pass control signal is produced while an engine speed represents the engine driving condition other than an idling state and a vehicle speed is lower than a predetermined vehicle speed criterion representing a substantially low vehicle speed.

9. In a pressure control system for a lock-up clutch of a lock-up type automotive automatic power transmission including a torque converter associated with an input element inputting driving torque from a prime mover and an output element for outputting driving torque, said torque converter including a lock-up clutch for establishing and releasing direct and mechanical connection between said input and output elements, a lock-up control fluid circuit connected to a pressurized fluid source which has a variable discharging rate depending upon an engine revolution speed, for adjusting fluid pressure to be applied to said lock-up clutch for engaging and disengaging said lock-up clutch depending upon vehicle driving condition, a lubricating circuit branched from said lock-up control circuit for circulating part of working fluid flowing ins aid lock-up control fluid circuit for lubrication,
   a method for controlling fluid supply comprising the steps of:
   providing a flow restriction means in said lubricating circuit for varying magnitude of flow restriction for varying fluid flow rate through said lubricating circuit;
   monitoring the discharge rate of said pressurized fluid source; and
   controlling said flow restriction means for providing greater flow restriction magnitude while the monitored discharge rate is smaller than given value and for providing smaller flow restriction magnitude when the monitored discharge rate is greater than said given value.

10. A pressure control system for a lock-up clutch of an automatic transmission for a vehicle comprising:
    a torque converter associated with an input element inputting driving torque from a prime mover and an output element for outputting the driving torque, said torque converter including a lock-up clutch for establishing and releasing engagement between the input and output elements;
    a lock-up control fluid circuit connected to a pressurized fluid source which has a variable discharge rate dependent upon engine speed, said lock-up control fluid circuit adjusting fluid pressure to be applied to said lock-up clutch for establishing and releasing the engagement between the input output elements;
    a lubricating circuit branched from said lock-up control circuit for delivering a portion of a working fluid from the pressurized fluid source for lubrication; and
    flow restriction means for controlling a flow rate of the working fluid in said lubricating circuit, said flow restriction means including first and second fluid circuits which are fluidly connected to said lubricating circuit in parallel to each other, the first fluid circuit providing a first flow restriction at a constant rate when the flow rate of working fluid is above a given value, the second fluid circuit providing a second flow restriction which is variable dependent upon a pressure variation of the working fluid discharged by said pressurized fluid source when the flow rate of working fluid is lower than a given value.

11. A system as set forth in claim 10, wherein the first fluid circuit includes a fixed path area orifice, the second fluid circuit including a valve which is operable to allow or block fluid flow through the second fluid circuit in response to a pressure level of the working fluid discharged by said pressurized fluid source.

12. A system as set forth in claim 11, wherein the valve is responsive to a pressure level greater than a preselected value to block the fluid flow through the second fluid circuit.

* * * * *

UNITED STATES PATENT AND TRADEMARK OFFICE
CERTIFICATE OF CORRECTION

PATENT NO. : 5,090,527

DATED : February 25, 1992

INVENTOR(S) : Hiroyuki Imamura, et al

It is certified that error appears in the above-identified patent and that said Letters Patent is hereby corrected as shown below:

On the title page, Insert the following:

-- Foreign Application Priority Data

September 26, 1989 [JP] Japan..............1-249692 --

Signed and Sealed this

Twenty-ninth Day of June, 1993

Attest:

MICHAEL K. KIRK

*Attesting Officer*      *Acting Commissioner of Patents and Trademarks*